INVENTOR.
Robert J. Wente
BY Paul Fitzpatrick
ATTORNEY

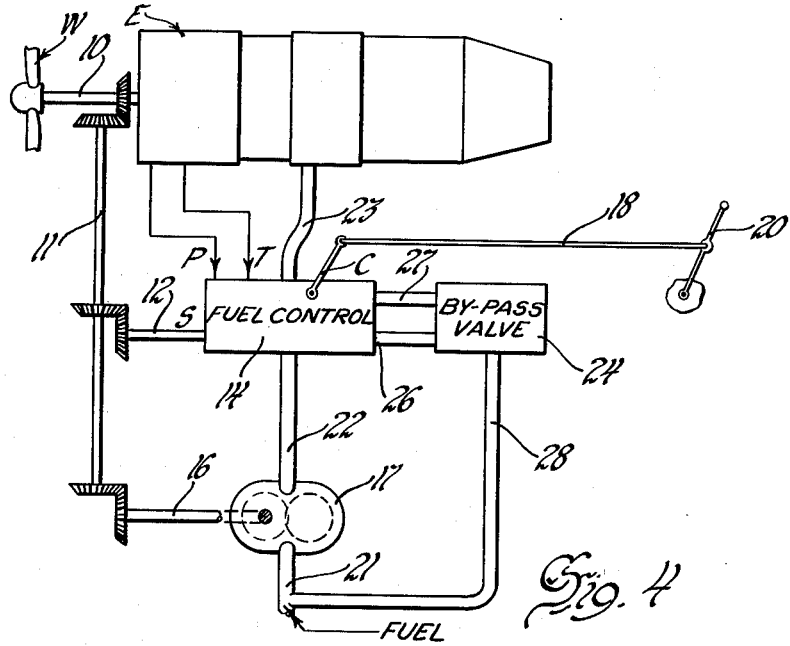
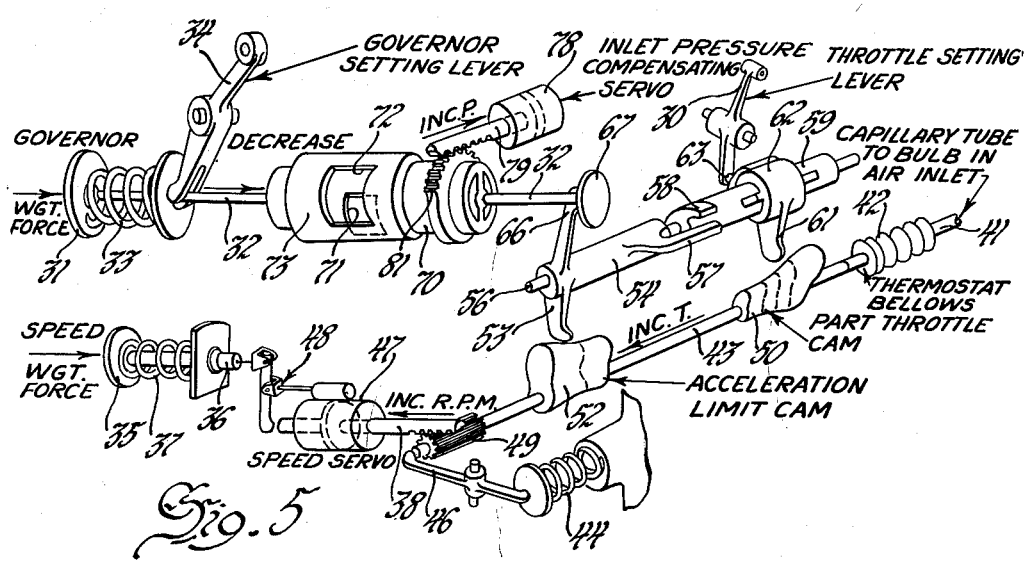

United States Patent Office 2,978,034
Patented Apr. 4, 1961

2,978,034

TURBOPROP ENGINE IDLING CONTROL

Robert J. Wente, Indianapolis, Ind., assignor to General Motors Corporation, Detroit, Mich., a corporation of Delaware Filed Aug. 16, 1955, Ser. No. 528,703

8 Claims. (Cl. 170—135.72)

This invention is directed to improved controls for gas turbine propeller aircraft engines, commonly called turboprop engines. It is particularly directed to improving the landing characteristics of airplanes propelled by such engines.

In general, the problem of controlling a turboprop engine is a rather complicated and difficult one. In flight, it is advantageous to control engine speed by a variable pitch speed governing propeller and control the power developed, and hence the propulsive effort, by varying the flow of fuel to the engine. Such a control requires safeguards, however. It must, if it is to function acceptably, be such that it prevents overtemperature conditions in the engine, prevents cutting fuel flow below the minimum at which combustion will be maintained, and schedules acceleration or deceleration of the engine so as to prevent surge, stall, transient excess temperature conditions, or flameout of the engine. A suitable control also must compensate for changes in temperature and pressure of the air entering the engine so that the engine will function consistently and satisfactorily over a wide range of altitude and temperature without constant adjustment of the control by the pilot or flight engineer.

Additionally, such controls frequently include some mechanism directly responsive to turbine inlet or outlet temperature which serves as an overriding control to limit fuel flow whenever turbine temperature reaches a danger point, and, in most cases, an overspeed governor.

There are known controls for gas turbines, operating as indicated above, which meter fuel flow to the engine in response to three control parameters; engine speed, total pressure of inlet air, and total temperature of inlet air. Such controls, however, so far as I am aware, have heretofore converted these parameters into fuel flow so as to maintain turbine inlet temperature constant at any given control setting.

Of course, it is possible to control an engine on the basis of other parameters, but this is the preferred system. It is satisfactory for flight at full power or under cruising conditions, but it has been found to be unsatisfactory during landing approaches, which should be made with the engine idling. In one installation it has been found desirable to make the landing approach with the engine developing slightly less than zero output; specifically, taking from the propeller about five per cent of the maximum engine power rating.

For best performance in landing, the power output of the engine should be maintained constant during the landing approach at a value which is consonant with the low speed flight or landing approach characteristics of the particular aircraft. In this discussion, it should be understood that the term power output may refer to a negative power output as well as a positive one, and that idling operation is operation with power output near zero.

Principally because of the different ambient temperatures encountered during landing approaches, and the operating characteristics of gas turbines, the prior art fuel control metering fuel to the engine so as to maintain turbine inlet temperature substantially constant will not maintain constant idling horsepower.

The control system of this invention will provide substantially constant idling power output of the engine during a landing approach on the basis of the three controlling parameters of inlet pressure and temperature and engine speed. By virtue of this improved mode of operation, the aircraft may be brought in on a landing approach at a constant power lever setting and it is not necessary for the pilot to devote constant attention to adjusting the power output of the engine to keep the aircraft in the rather narrow range of speeds slightly above stalling speed suitable for landing.

The principal objects of the invention are to improve the operating characteristics of gas turbine powered aircraft and to improve controlling methods and means for turboprop engines.

The manner in which these objects are achieved and the advantages of the invention will be apparent to those skilled in the art from the succeeding detailed description of the preferred mode of carrying out the invention and the preferred embodiment of means embodying the invention, illustrated by the accompanying drawings, in which:

Figure 4 is an elementary schematic diagram of a gas turbine fuel system; and

Figure 5 is a schematic diagram of the relevant parts of a fuel control embodying the invention.

Figure 1:
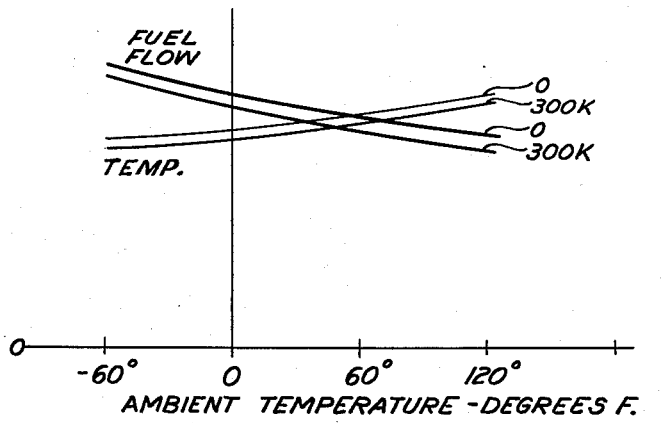
Figure 1 is a chart illustrating the fuel flow and turbine temperature characteristics of a typical turboprop engine as a function of ambient temperature at constant idling horsepower.

Referring first to Figure 1, this is a diagram illustrating the variation of turbine inlet temperature and fuel flow to maintain constant idling power output of an engine as ambient temperature varies from —60° to 120° F., engine r.p.m. being constant. There are two curves for each of these variables, one representative of variation at zero air speed and the other indicating variation at an air speed of three hundred knots. As will be apparent, as ambient temperature increases, turbine inlet temperature for constant idling power output increases quite substantially. Contrariwise, to maintain constant power output, fuel flow must decrease as the ambient temperature increases. The fuel required and turbine inlet temperature will both be lower at the three hundred knot air speed because of the contribution of ram effect of air entering the compressor to engine power output. Looked at another way, this means that when the aircraft slows down the fuel requirement increases slightly; if this requirement is not met, power will decrease. However, over the landing approach speed range, this effect is inconsiderable.

As will be apparent, since turbine inlet temperature increases with increasing ambient temperature for constant idling power output, a control set up to maintain turbine inlet temperature constant would decrease the power of the engine as ambient temperature increases. This would be accomplished, of course, by decreasing fuel flow as turbine inlet temperature tends to increase with higher ambient temperature so as to maintain the temperature constant. In other words, the fuel flow curve would have a steeper slope than that in Figure 1. This condition is also very likely to be encountered in landing where air temperature increases rapidly as the ground is approached.

Of course, at higher power settings of the engine, it is not practicable to maintain constant shaft horsepower because of the resulting wide variations in turbine inlet temperature, the primary limiting factor of engine operation at such normal power output levels.

Figure 2:
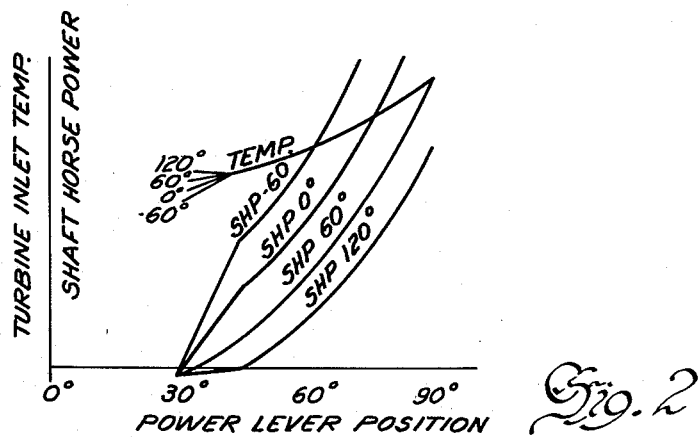
Figure 2 is a graphical illustration of the variation with power lever position and ambient temperature of engine shaft horsepower and turbine inlet temperature of a turboprop engine controlled in accordance with the invention.

Referring now to Figure 2, there is illustrated a schedule of turbine inlet temperature and shaft horsepower as a function of power lever position. The power lever is the lever moved by the pilot or flight engineer to determine engine output and, as is customary, its movement is referred to in terms of angles from zero to 90°. In the example illustrated, the maximum power output is at 90°. Cruising positions are in the range from 90° down to about 45°, and idling position is at 30°. Below 30° may be a ground maneuvering range of operation of the power plant at fixed propeller blade angle which is not affected by the present invention and, therefore, does not require analysis. It will be understood that above the 45° power lever position the power control sets a turbine inlet temperature. The fuel control acts to meter fuel to maintain this turbine inlet temperature and the power output of the engine is whatever the characteristics of the engine determine. It will be noted from Figure 2 that above the 45° position of the power lever the shaft horsepower of the engine increases with advance in the power lever position and that the power output is very strongly affected by ambient temperature. The characteristic of the engine is such that for constant turbine inlet temperature the power increases with decreasing ambient temperature. Thus, for example, the power output at the 45° position at —60° ambient temperature is about 60 percent of the maximum power output at 120° ambient temperature. With 120° ambient temperature and 45° power lever position, power output is substantially zero. The temperature curve illustrates the turbine inlet temperature corresponding to all of the four curves of shaft horsepower above the 45° control position. It will be noted that the increase in power is a function of a gradually increasing turbine inlet temperature. If this turbine inlet temperature curve were extrapolated below the 45° control position, it would correspond to the temperature line marked "60°" corresponding to 60° F. ambient temperature. In this case, the various shaft horsepower curves would remain widely separated below the 45° control position.

Figure 3:
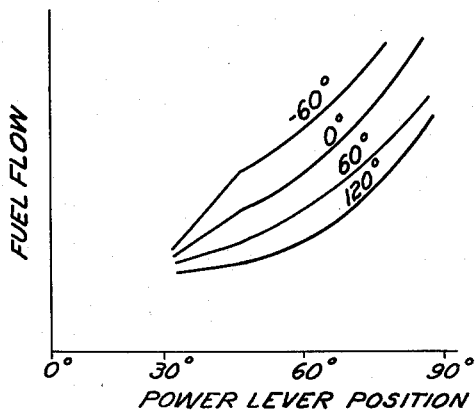
Figure 3 is a diagram illustrating variation in fuel flow with power lever position and ambient temperature.

In the control according to the invention, the mode of control gradually changes between the 45° control position and the 30° or idling control position so that at the 30° position the control meters fuel to maintain the same power output regardless of ambient temperature. In order to do this it must, of course, vary the turbine inlet temperature. This is illustrated by the convergence of the shaft horsepower curves from the 45° to the 30° control position and the diverging temperature curves for —60°, zero, 60° and 120° ambient temperature over the same control lever range. Thus, the control no longer attempts to maintain a constant turbine inlet temperature. This involves no hazard to the engine, since the idling is in a low and safe temperature range. Figure 3, which is a graph of typical fuel metering conditions as a function of power lever positions and ambient temperature, shows a fuel flow control schedule to obtain the result illustrated by Figure 2. Fuel is controlled to operate the engine at constant horsepower at the idling condition while operating it at constant turbine inlet temperature through the normal flight range. As will be apparent, the curve for 60° temperature, which is standard, is a gradual consistent curve through the entire range from maximum power to idle. However, the fuel flow curves for the lower ambient temperatures break downwardly to reduce flow and thus decrease power at idling, whereas the curve for 120° ambient temperature slopes less steeply and rises toward the standard or 60° curve as the 30° power lever position is approached.

It will be apparent from the foregoing how the control method of the invention effects a transition from control to maintain desired turbine inlet temperature under normal flight conditions to a control to maintain substantially constant power output during idling conditions such as are suitable for landing approaches. As a result, the performance of the aircraft in landing is consistent and safe and does not require undue attention from flight or ground personnel.

An embodiment of the invention in fuel control structures is illustrated in Figures 4 and 5. Referring first to Figure 4, there is illustrated an engine E coupled to a propeller W of the speed governing variable pitch type through a shaft 10. Shaft 10 is geared to an accessory drive shaft 11 which in turn is geared to a speed input shaft 12 of a fuel control 14 and to drive shaft 16 of a fuel pump 17. The fuel control also has an input of total presure in the engine air inlet, indicated by the line P, and an input of temperature in the air inlet, indicated by the line T. There is also a power control input to the fuel control indicated by the lever C coupled by linkage 18 to the pilot's engine control lever 20.

Fuel from a suitable source is supplied through line 21 to the pump, which discharges it through line 22 to the fuel control 14, which meters the fuel and delivers the required quantity to the engine through line 23. The fuel control includes a throttle or metering valve through which the fuel passes to the engine and a by-pass valve which maintains constant pressure across the throttling valve. For reasons of clarity, the by-pass valve 24 is shown as a separate element in Figure 4. This by-pass valve communicates with the upstream and downstream sides of the throttle valve through lines 26 and 27, respectively, and acts to maintain constant pressure across the throttle valve by returning the necessary portion of the pumped fuel to the pump inlet through a line 28. Such fuel metering systems are generally known and the relation of a by-pass valve to fuel metering valves is illustrated, for example, in British Patent 727,201.

The mode in which the invention is carried into effect will be more clearly apparent from further consideration of the preferred nature of the fuel control 14, the significant parts of which are illustrated schematically in Figure 5.

Referring to Figure 5, the control input lever C of the fuel control operates a throttle setting lever 30 through suitable means such as a cam (not shown). The speed input shaft 12 operates two speed responsive devices of the fly-ball type (not shown) one of which exerts a governor weight force against a plate 31 on a valve operating shaft 32. The governor weight force is resisted by spring 33 variably loaded by a governor setting lever 34 suitably coupled to input lever C, as by cam mechanism (not illustrated). The second speed response device exerts a speed weight force indicative of engine speed against a disk 35 on a reciprocable shaft 36 biased by a spring 37. The governor which moves shaft 32 is a governor in the usual sense of the word in that it may act to limit or control engine shaft speed under taxiing or fixed propeller pitch conditions. It also may act as an emergency limiting governor in event of failure of failure of the propeller governor. The speed weight force input to the shaft 36 is a control input for the fuel metering.

Fuel metering is also responsive, as previously stated, to temperature in the engine inlet through suitable mechanism such as a bulb in the air inlet (not shown) connected through a capillary tube 41 to a bellows 42. Bellows 42, when it expands, urges a rotatable and axially shiftable camshaft 43 to the left in the figure against the action of a spring 44 acting through a rocker arm 46 on the other end of the camshaft. The camshaft 43 receives also an input from the speed weight through a speed servo cylinder 47 controlled through a follower valve and feedback linkage 48 of suitable type by the speed shaft 36. The speed servo piston acts to rotate the camshaft through a rack 38 and a wide pinion 49 fixed on the camshaft.

Therefore, camshaft 43 is turned in response to engine speed and is shifted axially in response to inlet temperature. Camshaft 43 bears a part throttle cam 50 and an acceleration limit cam 52. The acceleration limit cam is provided to control transient conditions of the engine during changes in power control settings. It may be engaged by a follower 53 extending from a sleeve 54 rotatably mounted on a shaft 56. The sleeve 54 is integral with an arm 57 which has a lost motion connection with an arm 58 on a second sleeve 59 rotatably mounted on shaft 56. A cam follower 61 is integral with a slidable collar 62 splined to the sleeve 59. Collar 62 is shifted axially of the sleeve 59 by a pin 63 extending from the throttle setting lever 30. As will be apparent, axial movement of camshaft 43 by the temperature response and, likewise, shifting the follower 61 through operation of the control input C, changes the zone of cam 50 which is engaged by follower 61.

Cam 50 is normally coupled through follower 61, collar 62, sleeve 59 and engaging arms 58 and 57 to sleeve 54, which has an arm 66 which normally bears against a disk 67 on valve shaft 32. A rotatable and axially shiftable metering valve member 70 mounted on shaft 32 is formed with a generally rectangular opening 71 which cooperates with a rectangular opening 72 in an outer valve sleeve 73 to define a variable orifice which is the fuel metering orifice or throttle valve of the fuel control. Fuel flows radially from within the valve sleeve through the orifice defined by the openings 71 and 72, which is in the path between lines 22 and 23 of Figure 4.

The area of the orifice may be varied by either axial or rotary movement of sleeve 70. Axial movement is controlled by the speed governor weight force, the force of spring 33, and the action of the cams on shaft 43. Rotary movement is responsive to the pressure input P of Figure 4 which preferably acts through a suitable servomechanism, the inlet pressure compensating servo 78, which is controlled in any known manner so that it acts to move the piston rod 79 of the servo in response to total pressure in the air inlet. The piston rod 79 has rack teeth on it to cooperate with a gear sector 81 on the sleeve 70 so that it is rotated to open the valve as inlet pressure increases. The action of inlet pressure is relatively simple in that it acts alone to vary one dimension of the orifice.

The axial shifting of the valve is more complex. However, normally this valve is controlled by cam 50 acting through cam follower 61 as previously described against the resistance of spring 33. Under these conditions, the acceleration limit cam is not effective. However, under transient conditions of operation of the engine, the acceleration limit cam may engage follower 53 to rotate sleeve 54 clockwise as illustrated in Figure 5, separating abutting arms 57 and 58 and overriding the action of cam 50 in a direction to close the valve and thus limit fuel flow. If, for any reason, such as failure of the propeller governor, engine speed increases to the point where the governor weight force will overcome the setting of spring 33, the governor acts to move shaft 32 and valve sleeve 70 to the right to decrease fuel flow, the disk 67 moving away from arm 66 in this case.

In flight, the speed governor is set higher than the propeller governor and is operative only in the event of failure of the propeller governor. However, this governor also provides for operation of the power plant in fixed blade angle operation for taxiing and braking, in which case the governor normally may limit engine speed and thus be in command of the throttle. This mode of operation of the engine is not material to the present invention, which is usable under different conditions and whether or not any fixed blade angle operation of the engine is available.

Considering the operation of the system and assuming that the airplane is in normal flight, the pilot will have his engine control lever 20 in a flight or cruise setting calling for normal power output of the engine. This setting of control lever 20 operates through the input arm C of the fuel control, and fuel control will be at a high power setting with cam follower 61 toward the left or near end of cam 50 as shown in Figure 5. If the pilot wishes to operate the plane in flight at low speed, he moves the control 20 to call for lower power and cam follower 61 will be moved toward the intermediate zone of the cam for lower power settings. The combined effect of the inlet pressure, inlet temperature, and speed senses acts to supply fuel so as to maintain constant turbine inlet temperature. Engine speed normally does not vary because it is determined by the propeller governor and, in the power plant described herein, constant speed operation of the propeller throughout the available range of power for flight purposes is the preferred mode of operation.

It will be seen, therefore, that in normal flight the pilot acts to maintain a variable engine power level conditioned primarily on a scheduled turbine temperature. Such control could, of course, be exercised by response by the pilot to an indication of turbine temperature and corresponding movement of the control 20 to hold the temperature at the desired value. Such a mode of operation, depending on direct response by the pilot to turbine temperature, is impractical, particularly for multi-engine aircraft. Therefore, all practical installations embody power control means which may be such as that described herein in which the turbine temperature is maintained more or less accurately at a value determined by the pilot by setting the control lever 20.

Assuming now that the plane approaches for a landing, the throttle will be cut back by the pilot, the power control lever being moved to the 30° position which corresponds to flight idle and which, for example, may call for a negative power output of 175 H.P. from the engine. The cam follower 61 is moved farther to the right on cam 50 to call for lower fuel input and thus less power and moves into the zone represented by the 30° power lever position values in the curves of Figures 2 and 3. The effect of inlet temperature on fuel flow is modified so as to maintain constant power instead of constant turbine inlet temperature. With the airplane in the landing glide the propeller remains in governing operation and windmills so as to provide some power to the engine. Because the power output of the engine is kept constant, the windmilling drag of the propeller remains constant at the various ambient conditions. This constant engine power output could be maintained with any elementary fuel throttling means by providing the pilot with an indication of engine power output and having the pilot adjust the control lever 20 for each engine during the landing approach to hold the power at the desired level. This would be impractical, since it would call for too much attention to engine control at a time when there are many other things to be attended to by the pilot. Ordinarily, at about touchdown, the speed of the aircraft decreases to a point at which the governor brings the propeller against a low pitch stop so that the propeller governor loses control. As the speed of the aircraft decreases on the runway the power input from the propeller to the engine decreases and, therefore, the engine speed tends to decrease.

In this phase of operation, however, the part throttle cam 50 is so contoured that substantial decrease of engine speed below the normal flight r.p.m. acts through the speed weight servo 47, rotating camshaft 43, to rotate cam 50 under follower 61. The cam is so contoured that this rotation increases fuel flow to the engine with decreasing engine speed. In this regime the speed weight input and the mechanism actuated thereby thus serves as an underspeed governor to keep engine power output up to the demand imposed by the propeller.

This underspeed governor mode of operation also may be used in taxiing and braking operation of the engine at fixed blade angle, since increase in load on the engine by increasing pitch of the propeller tends to slow the engine, which causes the underspeed goverenor to increase fuel and minimize the drop in speed consequent upon the imposition of the higher load.

It may be noted that the response of the fuel control to engine inlet pressure remains the same in all modes of operation. Increase in ambient pressure tends to increase the power output of the engine, but since such increase in ambient pressure is accompanied by an increase in the drag of the aircraft these two effects are substantially mutually compensatory.

As stated, the value of the constant power operation is primarily in the improved control and safety of the aircraft during the landing approach. This valuable feature has been added to the previously known turbine control systems without injuring the performance of the engine or hazarding its components in the higher powered ranges used for normal flight.

As will be apparent to those skilled in the art, the principles of the invention may be embodied in various fuel control systems and the scope of the invention is not to be considered as limited by the detailed description herein of the preferred embodiment thereof.

I claim:

1. The method of operating a gas turbine propeller aircraft propulsion power plant comprising regulating the fuel supply to the power plant to maintain turbine temperature substantially constant notwithstanding variations in ambient atmospheric temperature, and varying propeller pitch to absorb the engine power output at substantially constant speed, over a flight range from maximum power to a low power condition; and regulating the fuel supply to the power plant to maintain engine power output substantially constant notwithstanding variations in ambient atmospheric temperature, at a low power setting suitable for aircraft landing approaches.

2. The method of operating a gas turbine propeller aircraft propulsion power plant comprising regulating the fuel supply to the powere plant to maintain turbine temperature substantially constant notwithstanding variations in ambient atmospheric temperature, and varying propeller pitch to absorb the engine power output at substantially constant speed, over a flight range from maximum power to a low power condition; regulating the fuel supply to the power plant to maintain engine power output substantially constant notwithstanding variations in ambient atmospheric temperature, at a low power setting suitable for aircraft landing approaches; and limiting the minimum value of propeller pitch at the lower power setting.

3. The method of operating a gas turbine propeller aircraft propulsion power plant comprising regulating the fuel supply to the power plant to maintain turbine temperature substantially constant notwithstanding variations in ambient atmospheric temperature, and varying propeller pitch to absorb the engine power output at substantially constant speed, over a flight range from maximum power to a low power condition; regulating the fuel supply to the power plant to maintain engine power output substantially constant notwithstanding variations in ambient atmospheric temperature, at a low power seting suitable for aircraft landing approaches; limiting the minimum value of propeller pitch at the low power setting; and regulating the fuel supply to the engine at the low power seting in accordance with engine speed when engine speed approaches a minimum desired value.

4. The method of operating a gas turbine propeller aircraft propulsion power plant comprising regulating the fuel supply to the power plant to maintain turbine temperature substantially constant notwithstanding variations in ambient atmospheric temperature, and varying propeller pitch to absorb the engine power output at substantially constant speed, over a flight range from maximum power to a low power condition; and regulating the fuel supply to the power plant to maintain engine power output substantially constant notwithstanding variations in ambient atmospheric temperature, while varying propeller pitch subject to a fixed low pitch limit, at a low power setting suitable for aircraft landing approaches.

5. A fuel control for a gas turbine aircraft engine comprising, in combination: fuel metering means; means responsive to a condition representative of ambient atmospheric temperature; settable power control means for controlling the power output of the engine; means coupling the responsive means to the metering means, the coupling means being connected to and controlled by the power control means, the coupling means including means operative at the idling power setting of the power control means to vary fuel flow as a function of ambient atmospheric temperature so as to maintain engine power output substantially constant notwithstanding variations in ambient atmospheric temperature and means operative at power settings above the idling power setting of the power control means to vary fuel flow as a function of ambient atmospheric temperature so as to maintain turbine temperature of the engine substantially constant notwithstanding variations in ambient atmospheric temperature.

6. A fuel control for a gas turbine aircraft engine coupled to a speed-governing propeller, the control comprising, in combination: fuel metering means; means responsive to a condition representative of ambient atmospheric temperature; settable power control means for controlling the power output of the engine; means coupling the responsive means to the metering means, the coupling means being connected to and controlled by the power control means, the coupling means including means operative at the idling power setting of the power control means to vary fuel flow as a function of ambient atmospheric temperature so as to maintain engine power output substantially constant notwithstanding variations in ambient atmospheric temperature and means operative at power settings above the idling power setting of the power control means to vary fuel flow as a function of ambient atmospheric temperature so as to maintain turbine temperature of the engine substantially constant notwithstanding variations in ambient atmospheric temperature.

7. A fuel control for a gas turbine aircraft engine coupled to a speed-governing propeller, the control comprising, in combination: fuel metering means; means responsive to a condition representative of ambient atmospheric temperature; settable power control means for controlling the power output of the engine; means coupling the responsive means to the metering means, the coupling means being connected to and controlled by the power control means, the coupling means including a first portion operative at the idling power setting of the power control means constructed to vary fuel flow as a function of ambient atmospheric temperature so as to maintain engine power output substantially constant notwithstanding variations in ambient atmospheric temperature and a second portion operative at power settings above the idling power setting of the power control means constructed to vary fuel flow as a function of ambient atmospheric temperature so as to maintain turbine temperature of the engine substantially constant notwithstanding variations in ambient atmospheric temperature.

8. A fuel control for a gas turbine aircraft engine coupled to a speed-governing propeller, the control comprising, in combination: fuel metering means; means responsive to a condition representative of ambient atmospheric temperature; settable power control means for controlling the power output of the engine; means coupling the responsive means to the metering means, the coupling means being connected to and controlled by the power control means, the coupling means including a first cam portion operative at the idling power setting of the power control means contoured to vary fuel flow as a function of ambient atmospheric temperature so as to maintain engine power output substantially constant notwithstanding variations in ambient atmospheric temperature and a second cam portion operative at power settings above the idling power setting of the power control means contoured to vary fuel flow as a function of ambient atmospheric temperature so as to maintain turbine temperature of the engine substantially constant notwithstanding variations in ambient atmospheric temperature.

References Cited in the file of this patent

UNITED STATES PATENTS

| | | |
|---|---|---|
| 2,628,472 | Dray et al. | Feb. 17, 1953 |
| 2,638,742 | Carey | May 19, 1953 |
| 2,640,550 | Knapp et al. | June 2, 1953 |
| 2,667,228 | Wood et al. | Jan. 28, 1954 |
| 2,759,549 | Best | Aug. 21, 1956 |